US007724272B2

(12) United States Patent
Uchiyama

(10) Patent No.: US 7,724,272 B2
(45) Date of Patent: May 25, 2010

(54) PRINT UNIT

(75) Inventor: Hiroyuki Uchiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/207,100

(22) Filed: Sep. 9, 2008

(65) Prior Publication Data

US 2009/0009581 A1 Jan. 8, 2009

Related U.S. Application Data

(62) Division of application No. 10/200,327, filed on Jul. 23, 2002, now abandoned.

(30) Foreign Application Priority Data

| | | |
|---|---|---|
| Aug. 1, 2001 | (JP) | 2001-234172 |
| Sep. 3, 2001 | (JP) | 2001-265702 |
| Jun. 5, 2002 | (JP) | 2002-164933 |

(51) Int. Cl.
*B41J 2/44* (2006.01)
*G03B 17/24* (2006.01)

(52) U.S. Cl. ........ 347/136

(58) Field of Classification Search ........ 396/310; 347/111, 129, 134, 135, 136
See application file for complete search history.

(56) References Cited

U.S. PATENT DOCUMENTS

| | | | | |
|---|---|---|---|---|
| 4,312,581 | A | 1/1982 | Miyagawa et al. | |
| 4,361,388 | A | 11/1982 | Micak et al. | |
| 5,894,326 | A | 4/1999 | McIntyre et al. | |
| 6,195,196 | B1 * | 2/2001 | Kimura et al. | 359/295 |

FOREIGN PATENT DOCUMENTS

| | | |
|---|---|---|
| JP | 56-100892 | 12/1981 |
| JP | 9-160115 | 6/1997 |
| JP | 11-320958 | 11/1999 |

OTHER PUBLICATIONS

Computer-generated translation of JP 09-160115, published on Jun. 1997.*

* cited by examiner

*Primary Examiner*—Huan H Tran
(74) *Attorney, Agent, or Firm*—Sughrue Mion, PLLC

(57) ABSTRACT

A print unit for transferring an image to a photosensitive medium is provided, and the print unit includes an intercepting member for intercepting light; a first plane light-emitting member for forming a first image by emitting light, provided on one side of the intercepting member; a second plane light-emitting member for forming a second image by emitting light, provided on the other side of the intercepting member; and a control unit for controlling light-emission of the first and second surface emitting members and transferring at least one or more of images to the photosensitive medium.

6 Claims, 15 Drawing Sheets

PRINT UNIT

CROSS-REFERENCE TO RELATED APPLICATIONS

This is a Divisional of application Ser. No. 10/200,327 filed Jul. 23, 2002, which claims priority from Japanese patent applications Nos. 2001-234172, filed on Aug. 1, 2001, 2001-265702 filed on Sep. 3, 2001 and 2002-164933 filed on Jun. 5, 2002. The entire disclosure of the prior applications are considered part of the disclosure of the accompanying Divisional Application, the contents of which are hereby incorporated by reference.

BACKGROUND OF THE INVENTION

1. Field of the Invention

The present invention relates to a print unit, more particularly to a print unit for using a photographing device.

2. Description of the Related Art

A method of transferring an image to a photosensitive medium by using EL element in a print unit is known to the public by Japanese Patent Application Laid-open No. Hei. 11-320958 and Japanese Patent Application Laid-open No. Hei. 09-160115.

The printer shown by Japanese Patent Application Laid-open No. Hei. 11-320958 exposes one line amount of a photosensitive material by illuminating one line amount of EL elements. After exposure of one line amount of photosensitive material is finished, by moving one line amount of photosensitive material through controlled vertical scanning in the sub-scanning direction, the next one line amount of the photosensitive material is exposed.

Further, the printer shown by Japanese Patent Application Laid-open No. 09-160115 comprises a multilayer-structured EL device placed between two shutter members.

Still further, U.S. Pat. No. 5,894,326 (corresponding to Japanese Patent Application Laid-open No. Hei. 10-93906) shows a digital camera having a printer. The digital camera also have a display unit being movable between a position where a user can look it and another position where the unit print on a photosensitive medium. At the position of printing, the display unit serves to exposure the medium for the printer.

However, it takes a long time to copy the image because of exposing a material by one line to the photosensitive medium according to the printer described in Japanese Patent Application Laid-open No. Hei. 11-320958. Moreover, it is difficult to miniaturize the printer because the vertical scanning requires moving the sensitive medium. It is difficult to display the image to the outside of the printer and transfers the image to the photosensitive medium, because operations of the device is controlled to close and open the first shutter member or second shutter member by turns, according to the information photographing and transferring device described in Japanese Patent Application laid-open No. Hei. 9-160115.

In the digital camera shown by U.S. Pat. No. 5,894,326, the display unit, which is mechanically moved, have more complex in structure. Moreover, when the display unit is used not for exposing in the printer but for displaying to the user, a space where the display unit retreats from the printer. Therefore, the digital camera becomes large in size.

Moreover, it tends to generate distortion of the image in case of transferring in the abovementioned printers.

SUMMARY OF THE INVENTION

Therefore, it is an object of the present invention to provide a print unit, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, there is provided a print unit for transferring an image to a photosensitive medium, comprising: an intercepting member for intercepting light; a first plane light-emitting member for forming a first image by emitting light, provided on one side of the intercepting member; a second plane light-emitting member for forming a second image by emitting light, provided on the other side of the intercepting member; and a control unit for controlling light-emission of the first and second plane light-emitting members, and transferring at least one or more of images formed by the first and second plane light-emitting members, to the photosensitive medium.

In the print unit, at least one of the first and second plane light-emitting members may include an EL light-emitting member.

In the print unit, the control unit may control each of the first and second plane light-emitting members independently of each other.

In the print unit, the control unit may include a first control circuit for controlling the plane light-emitting member and second control circuit for controlling the second plane light-emitting member.

In the print unit, the control unit may include a switching unit which switches between the first plane light-emitting member and the second plane light-emitting member for either one operation of display, light-emission and ON/OFF of power-supply.

The print unit may further comprises a photographing unit for supplying photographed image to the control unit by taking a photograph of an object, wherein the second plane light-emitting member is arranged on a confront side of the object and the control unit activates at least one of the first and second plane light-emitting members.

In the print unit, wherein the intercepting member may include a first liquid crystal shutter for transmitting or intercepting light selectively, and a first shutter control unit for transmitting light by opening the first liquid crystal shutter or intercepting light by closing the first liquid crystal; and the control unit may open the first liquid crystal shutter by the first shutter control unit, and may activate both of the first and second light-emitting members.

The print unit may further comprises a second liquid crystal shutter for intercepting light selectively, which is arranged on a confront side of the photosensitive medium, and a second shutter control unit for intercepting light by closing the second liquid crystal shutter, wherein the control unit closes the second liquid crystal shutter by the second shutter control unit in case of activating both of the first and second light-emitting members.

The print unit may further comprises a photographing unit for supplying photographed image to the control unit by taking a photography of an object; wherein the second plane light-emitting member is provided on a side confronted with the photosensitive medium, the side being different from that confronted with the object; and the intercepting member includes a first liquid crystal shutter for transmitting or intercepting light selectively, a first shutter control unit for transmitting light by opening the first liquid crystal shutter and intercepting light by closing the first liquid crystal shutter, wherein the control unit opens the first liquid crystal shutter by the shutter control unit and transfers each of the images formed by the first and second plane light-emitting members to the photosensitive medium.

The print unit may further comprises: a second liquid crystal shutter, which is set up on an opposite side confronting with the first crystal shutter on the second plane light-emitting member, for transmitting or intercepting light selectively; and a second shutter control unit for transmitting light by opening the second liquid crystal shutter and intercepting light by closing the second liquid crystal shutter, wherein the control unit closes the second liquid crystal shutter in case of transferring each of images formed by the first and second plane light-emitting members to the photosensitive medium.

According to the second aspect of the present invention, there is provided a light-emitting member comprising: an intercepting member for intercepting light; a first plane light-emitting member provided on one side of the intercepting member; and a second plane light-emitting member provided on the other side of the intercepting member.

According to the third aspect of the present invention, there is provided a print unit for transferring an image to a photosensitive medium comprising: a plane light-emitting transferring unit including a plane light-emitting member, for transferring the image to the photosensitive medium from one side by forming the image on the light-emitting member; and a pressing unit for pressing the photosensitive medium to the plane light-emitting member in order for the one side of the photosensitive medium to contact with to the plane light-emitting member.

In the print unit, the pressing unit may include a pressing force control unit for controlling pressing force to be weakened in order for the photosensitive medium not to contact with the plane light-emitting transferring member.

In the print unit, the pressing unit may be controlled by the control unit in case that the photosensitive medium, where the image is transferred, is ejected out of the print unit.

In the print unit, the plane light-emitting member may include an EL light-emitting member.

In the print unit, the plane light-emitting member may include an ECL member.

In the print unit, the plane light-emitting member may include a curved portion on the one side.

In the print unit, the pressing unit may include an electromagnet which provides a dynamic pressing force.

In the print unit, the pressing unit may include an elastic member which provides an elastic pressing force.

In the print unit, the pressing unit may include an air pressure control unit which provides a pressing force of air pressure.

In the print unit, the plane light-emitting transferring unit may further include: a first shutter arranged between the plane light-emitting member and the photosensitive medium; and a first shutter control unit for adjusting gradation of an image transferred to the photosensitive medium by controlling the shutter speed of the first liquid crystal shutter and light emitting time of the plane light-emitting member.

In the print unit, the plane light-emitting unit may further include: a second liquid crystal shutter arranged on an opposite side of the first liquid crystal shutter in the plane light-emitting member, and a control unit for controlling the first liquid crystal shutter and the second liquid crystal shutter individually.

In the print unit, the control unit may close the first liquid crystal shutter and open the second liquid crystal shutter, in case that the plane light-emitting member displays the image to outside of the print unit.

In the print unit, the control unit may open the first liquid crystal shutter and close the second liquid crystal shutter in case that the plane light-emitting member transfers the image to the photosensitive medium.

In the print unit, the plane light-emitting transferring unit may further include: an intercepting member for intercepting light arranged on an opposite side of the photosensitive medium in the plane light-emitting member, and the second plane light-emitting member arranged on an opposite side of the plane light-emitting member in the intercepting member; and a control unit for controlling the plane light-emitting member and the second plane light-emitting member individually.

In the print unit, the intercepting member may include a liquid crystal shutter for transmitting or intercepting light selectively, and a shutter control unit for transmitting light by opening the liquid crystal shutter or intercepting light by closing the liquid crystal shutter; and the control unit may open the liquid crystal shutter by the shutter control unit, and activate both of the plane light-emitting member and the second light-emitting member.

According to the fourth aspect of the present invention, there is provided a print unit comprising: a case for enclosing a film cassette which accepts a plurality of photosensitive media and a light-intercepting sheet at an outermost layer of the plurality of photosensitive media; a side light-emitting transferring unit including a plane light-emitting member, one side of which is confronted with the light-intercepting sheet of the film cassette; and a pressing unit for pressing the photosensitive media to the plane light-emitting transferring unit in order for at least one of the photosensitive media to contact with at least a portion of the plane light-emitting transferring unit.

The print unit may further comprises a pressing force control unit for controlling the pressing unit to weaken pressing force of the pressing unit when the film cassette is ejected from the print unit.

In the print unit, the film cassette further may include an insert/eject detecting unit for detecting ejection of the film cassette from the print unit.

In the print unit, the pressing unit may include an electromagnet which provides a dynamic pressing force.

In the print unit, the pressing unit may include an elastic member which provides an elastic pressing force.

In the print unit, the pressing unit may include an air pressure control unit which provides a pressing force of air pressure.

In the print unit, the plane light-emitting transferring unit may further include: a first liquid crystal shutter arranged between the light-emitting member and the photosensitive medium; and a first shutter control unit for adjusting gradation of an image transferred to the photosensitive medium by controlling the shutter speed of the first liquid crystal shutter and light emitting time of the plane light-emitting member.

In the print unit, the plane light-emitting transferring unit may further include: a second liquid crystal shutter arranged on an opposite side of the first liquid crystal shutter in the plane light-emitting member; and a control unit for controlling the first liquid crystal shutter and the second liquid crystal shutter individually.

In the print unit, the control unit may close the first liquid crystal shutter and open the second liquid crystal shutter, in case that the plane light-emitting member displays the image to outside of the print unit.

In the print unit, the control unit may open the first liquid crystal shutter and close the second liquid crystal shutter in case that the plane light-emitting member transfers the image to the photosensitive medium.

In the print unit, the plane light-emitting transferring unit may further include: an intercepting member for intercepting light arranged on an opposite side of the photosensitive medium in the plane light-emitting member; a second plane light-emitting member arranged on an opposite side of the plane light-emitting member in the intercepting member; and a control unit for controlling the plane light-emitting member and the second plane light-emitting member individually.

In the print unit, the intercepting member may include a liquid crystal shutter for transmitting or intercepting light selectively, and a shutter control unit for transmitting light by opening the liquid crystal shutter or intercepting light by closing the liquid crystal shutter, and side control unit opens the liquid crystal shutter by the shutter control unit, and activates both of the plane light-emitting member and the second plane light-emitting member.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
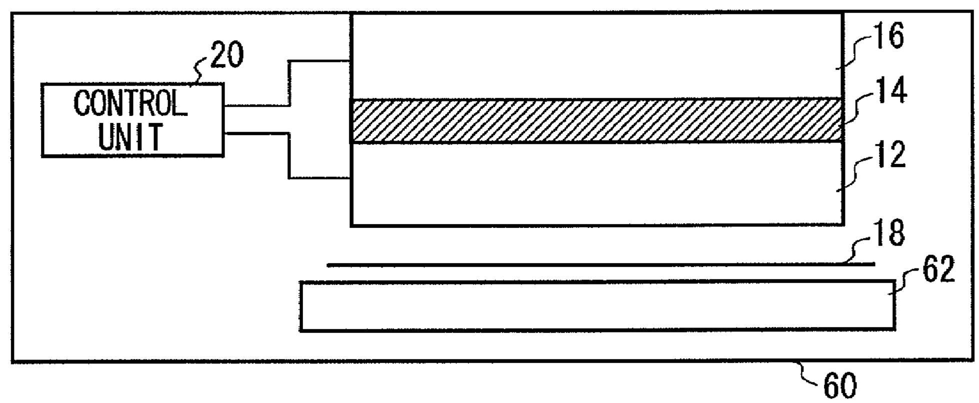
FIG. 1 shows a schematic diagram of a structure of a print unit according to one embodiment of the present invention.

FIG. 1 shows a schematic diagram of a structure of a print unit 10 according to one embodiment of the present invention. The print unit 10A includes a first plane light-emitting member 12, an intercepting member 14, a second plane light-emitting member 16, a photosensitive medium 18, a control unit 20, a supporting unit 62 and a case 60. The case 60 encloses the first plane light-emitting member 12, the intercepting member 14, the second plane light-emitting member 16, the photosensitive medium 18, the control unit 20, and the supporting unit 62.

The intercepting member 14 is made of, for example, a substantially sheet shaped material and intercepts the light. The supporting unit 62 maintains the photosensitive medium 18 of an almost sheet shape substantially in parallel with intercepting member 14. The first plane light-emitting member 12, for example, which has a substantial sheet shape, transfers the image to the photosensitive medium 18 by exposing the photosensitive medium 18, by emitting image formed on a front side of the photosensitive medium 18 facing the intercepting member 14. In FIG. 1, the bottom side of the first plane light-emitting member 12 is confronted with the photosensitive medium 18, and upside of the first plane light-emitting member 12 is in contact with the intercepting member 14. In other words, the print unit 10A arrange the intercepting member 14 in between the first and second plane light-emitting members 12 and 16.

The first plane light-emitting member 12 which irradiates image of light in plane, that is, with a certain area, and transfers the image in plane to the photosensitive medium 18. Accordingly, the print unit 10 A can transfers the image to the photosensitive medium at high speed.

The second plane light-emitting member 16 displays the image to the outside of the case 60. The second plane light-emitting member 16 is formed in, for example, a substantially sheet shape. The second plane light-emitting member 16 is formed on an opposite side of the side of the intercepting member 14 where the first plane light-emitting member 12 is formed. Upside of the second plane light-emitting member 16 is arranged in contact with the outside of the case 60, and the bottom side of second plane light-emitting member 16 is in contact with the intercepting member 14. Accordingly, the second plane light-emitting member 16 can display image to outside of the case 60.

The first plane light-emitting member 12 and second plane light-emitting member 16 include EL light-emitting members which can perform the light emission with surface of a certain area.

The control unit 20, which is connected to the first and the second plane light-emitting members 12 and 16, supplies the signal which makes each of the first plane light-emitting member 12 and the second plane light-emitting member 16 form the image. Moreover, the control unit 20 controls the first plane light-emitting member 12 and second plane light-emitting member 16, individually. For example, the control unit 20 controls first plane light-emitting member 12 to transfer an image to photosensitive medium 18 and second plane light-emitting member 16 to display the image to photosensitive medium 18. In other words, control unit 20 transfers at least one of images formed by the first and second plane light-emitting members 12 and 16 to the photosensitive medium 18.

Therefore, the print unit 10A in FIG. 1 can print the photosensitive medium in plane at high speed by a simple structure as the first plane light-emitting member 12 illuminates an image light in plane and exposes the photosensitive medium 18 to the image light. Further, the print unit 10A having the first plane light-emitting member 12 and second plane light-emitting member 16 displays an image to outside, and can transfer the image to the photosensitive medium 18.

Figure 2:
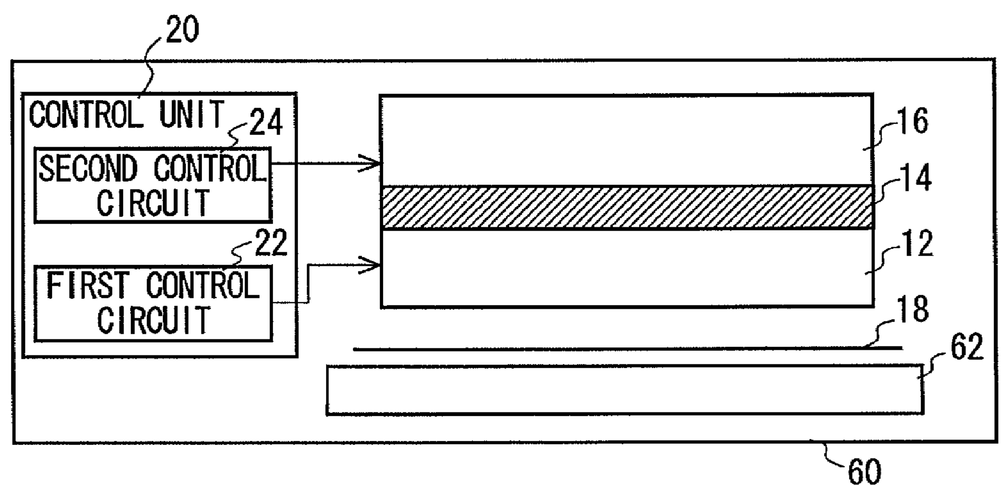
FIG. 2 shows a detailed diagram of a control unit of the print unit.

FIG. 2 shows another example of the control unit 20 of the print unit. The control unit 20 of print unit 10B controls the first and second plane light-emitting members 12 and 16, independently of each other. In the present embodiment of FIG. 2, the control unit 20 includes a first control circuit 22 connected to the first plane light-emitting member 12 for controlling the first plane light-emitting member 12, and a second control circuit 24 connected to the first plane light-emitting member 16 for controlling the first plane light-emitting member 16. In other words, the first plane light-emitting member 12 and second plane light-emitting member 16 are controlled by different control circuits 22 and 24, respectively. Therefore, as the first control circuit 22 forms the first image for the first light-emitting member 12 and the second control circuit 24 forms second image which is different from the first image, the first plane light-emitting member 12 and the second plane light-emitting member 16 can emit different images, respectively. For example, it is possible to control the first and second control circuits 22 and 24 such that the first plane light-emitting member 12 illuminates an image to be transferred to the photosensitive media 18 and the second plane light-emitting member 12 illuminates an information image of the number of the photosensitive media 18 being already exposed.

Figure 3:
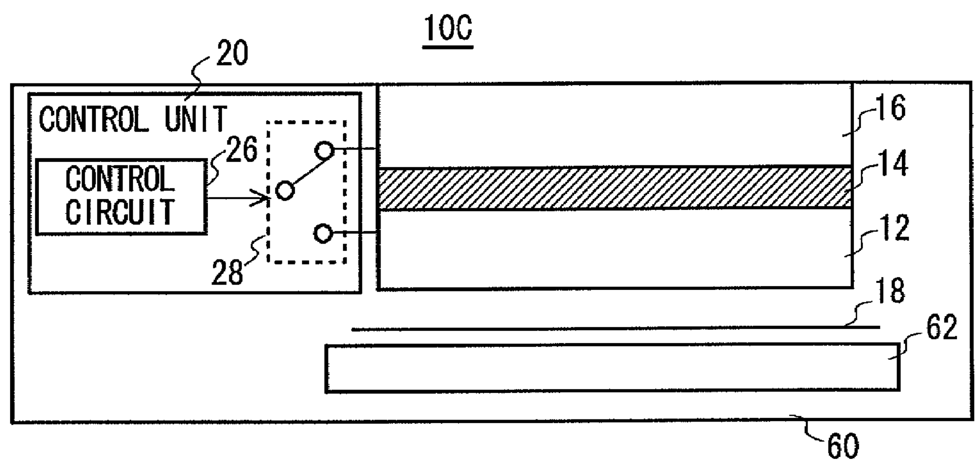
FIG. 3 shows another embodiment of the control unit.

FIG. 3 shows another embodiment of control unit 20. The control unit 20 of print unit 20 in FIG. 3 includes a control circuit 26 for forming an image for the first or second plane light-emitting member 12 or 16, and a switching unit 28 for switching signal which make an image formed by the first and/or second plane light-emitting members 12 and/or 16.

For displaying the image to the outside of the case 60 by using control unit 20, the switching unit 28 cuts connection between the control circuit 26 and the first plane light-emitting member 12 and establish connection between the control circuit 26 and the second plane light-emitting member 16. Therefore, the image outputted by the control circuit 26 is supplied not to the first plane light-emitting member 12 but to the second plane light-emitting member 16. Further, by the switching operation of the switching unit 28, the first plane light-emitting member 12 is turned out and the second plane light-emitting member 16 emits an image.

For transferring the image to the photosensitive medium 18 by using the control unit 20 shown in FIG. 3, the switching unit 28 connects the controls circuit 26 to the first plane light-emitting member 12, and cuts the connection between the control circuit 26 and the second plane light-emitting member 16. Therefore, the image outputted by the control circuit 26 is supplied not to the second plane light-emitting member 16 but to the first plane light-emitting member 12. Further, by the switching operation of the switching unit 28, the first plane light-emitting member 12 emits the image and the second plane light-emitting member 16 is turned out. Therefore, the control unit 20 of FIG. 3 makes the image emitted by at least any one of the first and second plane light-emitting members 12 and 16. In other words, by using the switching unit 28, the control unit can perform any one operation out of display, light-emission and ON/OFF of power-supply.

Figure 4:
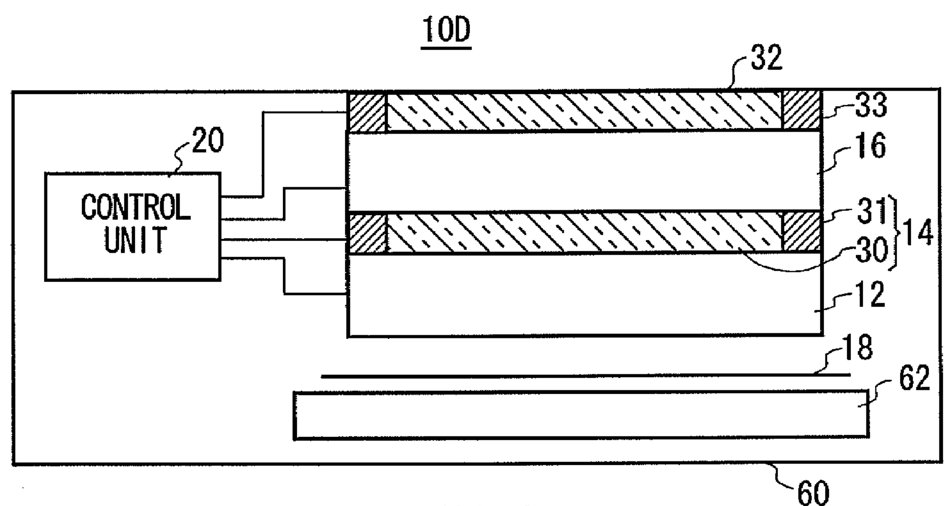
FIG. 4 shows another embodiment of the print unit.

FIG. 4 shows a print unit 10D according to another embodiment of the present invention. The print unit 10D in FIG. 4 has a different structure from that of the print unit 10A shown in FIG. 1 in that the intercepting member 14 includes a first and second liquid crystal shutters 30 and 32, where the second liquid crystal shutter 32 is provided on an opposite side of the first liquid crystal shutter 30 in the second plane light-emitting member 16. Therefore, the same reference numbers used in FIG. 1 are used again for the similar elements in FIG. 4, and detailed explanation for the similar elements is omitted.

The intercepting member in FIG. 4 includes the first liquid crystal shutter 30, which is transmitting or intercepting light selectively, and a shutter control unit 31 which let the light pass through by opening the first liquid crystal shutter 30 and intercepts the light by closing the first liquid crystal shutter 31. The intercepting member 14 is connected to the control unit 20. Therefore, when the control unit 20 transfers the image emitted by the second plane light-emitting member 16 to the photosensitive medium 18 together with the image of the first plane light-emitting member 12 by opening the first plane light-emitting member 30 when the first plane light-emitting member 12 transfers the image to the photosensitive medium 18. Therefore, the print unit 10 can transfer not only the image emitted by the first plane light-emitting member 12 but also the image emitted by the second plane light-emitting member 16 to the photosensitive medium 18. In other words, the control unit 20 opens the first liquid crystal shutter 30 by using the shutter control unit 31, and can transfer each of the images to the photosensitive medium 18 emitted by the first and second plane light-emitting members 12 and 16.

Moreover, when the first and second plane light-emitting members 12 and 16 transfer the emitted images to the photosensitive medium 18, the control unit 20 may supplies different images to the first and second plane light-emitting members 12 and 16, respectively, and transfers a superimposed image of the images emitted by the first and second plane light-emitting members 12 and 16 to the photosensitive medium 18.

The second liquid crystal shutter 32 is formed on and upper side of the second plane light-emitting member 16. The second liquid crystal shutter 32 is provided on an opposite side of the photosensitive medium 18 and intercepts the light selectively. The print unit 10D further includes a second shutter control unit 33 for intercepting the light by closing the second liquid crystal shutter 32.

In this case, the control unit 20 protects the photosensitive medium 18 from the light incident from the outside of the print unit 10 by closing the second liquid crystal shutter 32 when the first and second plane light-emitting members 12 and 16 transfer the emitted images to the photosensitive medium 18. In other words, the control unit 20 closes the liquid crystal shutter 32 by using the second shutter control unit 33 in case that the first and second plane light-emitting members 12 and 16 respectively transfer images to the photosensitive medium 18 in the print unit 10. Moreover, the control unit 20 intercepts the emitted image from the photosensitive medium 18 by closing the first liquid crystal shutter 30 by the first shutter control unit 31 in case that only image emitted by the first plane light-emitting member 12 is transferred to the photosensitive medium 18.

Figure 5:
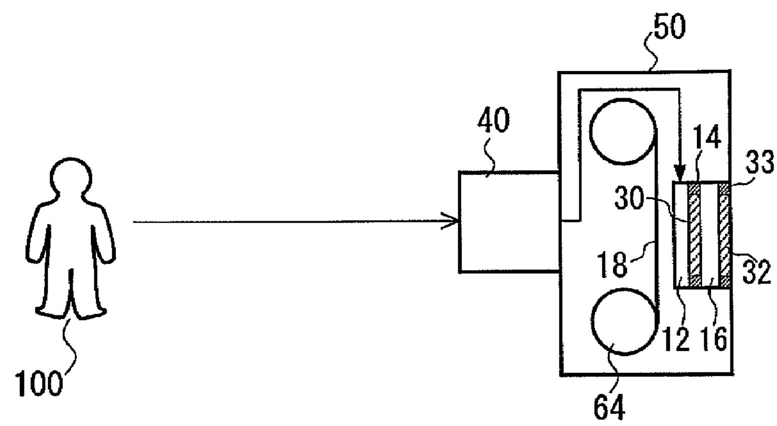
FIG. 5 shows another embodiment of the printing system using the print unit of FIG. 4.

FIG. 5 shows another embodiment of the printing system which uses a print unit shown in FIG. 4. The printing system 50 includes a photographing unit 40 which takes a photographic image of an object and provides the photographed image to the control unit 20. The control unit 20 is not shown for simplifying the drawing. The print unit 50 uses a roller 64 as a supporting unit. Two rollers 64 support each end of the photosensitive medium 18. The second plane light-emitting member 32 of the printing system 50 is provided on an opposite side of the object 100 at the time of taking photograph. In other words, in FIG. 5, the multilayered member of the plane light-emitting members 12 and 16 and the liquid crystal shutters 30 and 34 is arranged at a rear portion of the print unit 50 which is on an opposite side of the object 100. Moreover, the second liquid crystal shutter 32 is provided on the surface of the printing system 50.

The second light-emitting member 32 may be provided on a lateral surface, an upper surface or a lower surface of the printing system 50, instead of the rear surface of the printing system 50, as in FIG. 5.

According to the structure of the printing system 50 shown in FIG. 50, the control unit 20 can transfer the images emitted by the first and second plane light-emitting member 12 and 16 to the photosensitive medium 18, as it opens the first liquid crystal shutter 30 and closes the second liquid crystal 32 when the first plane light-emitting member 12 transfers the image to the photosensitive medium 18.

Figure 6:
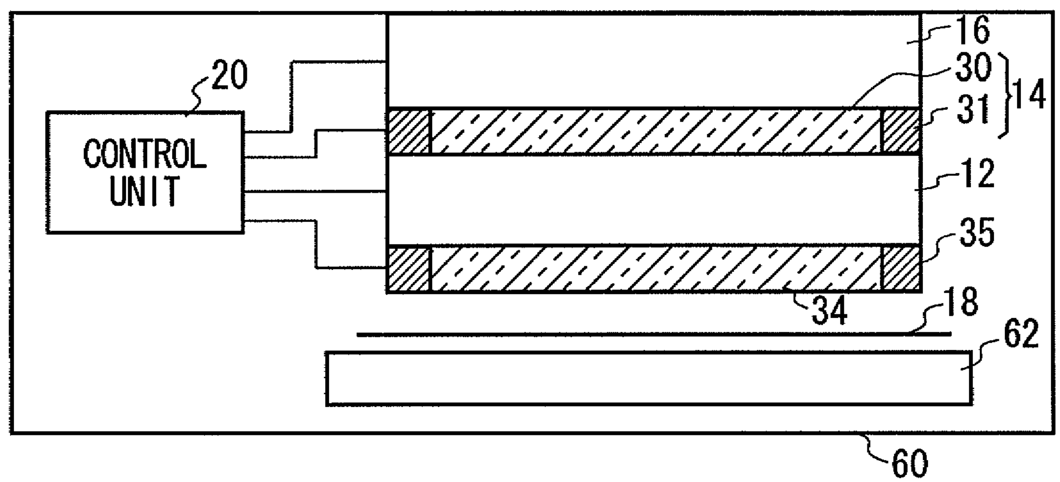
FIG. 6 shows another embodiment of the print unit.

FIG. 6 shows yet another embodiment of the print unit. The print unit 10 shown in FIG. 6, in addition to the structure of the print unit 10 shown in FIG. 1, further includes a second liquid crystal shutter 34, which is provided on a side confronted with the photosensitive medium 18 on the plane light-emitting member 12, for intercepting the light selectively, and a control unit 35 for intercepting the light by closing the second liquid crystal shutter 34.

The intercepting member 14 is connected to the control unit 20. Moreover, the intercepting member 14 includes the first liquid crystal shutter 30 which transmits or intercepts the light selectively, and the first shutter control unit 31 which transmits the light by opening the first liquid crystal shutter 30 or intercepts the light by closing the first liquid crystal shutter 30. By doing this, the print unit 10 in FIG. 6 can be used not only as a means of a printer for transferring the image to the photosensitive medium 18 but also as a means of a light-emitting lamp or a strobe of high brightness. In other words, the control unit 20 opens the first liquid crystal shutter 30 by using the liquid crystal control unit 31 and activates both of the first and second plane light-emitting members 12 and 16.

For example, the control unit 20 opens the first liquid crystal shutter 30 and transmits the light emitted by the first plane light-emitting member 12 to the second plane light-emitting member 16 when the print unit 10 is used as a light-emitting source of high brightness. The light emitted by the first plane light-emitting member 12 is emitted to the outside of the case 60 through the second plane light-emitting member 16. Moreover, the control unit 20 protects the photosensitive medium 18 from the light illuminated by the first plane light-emitting member 12 and second plane light-emitting member 16 by closing the second liquid crystal shutter 34. In other words, the control unit 20 closes the second liquid crystal shutter 34 when the first and second plane light-emitting members 12 and 16 is activated to emit light.

Next, the control unit 20 activates the first and second plane light-emitting members 12 and 16. The print unit 20 can serve as a light-emitting source of high brightness because the light emitted by the first and second plane light-emitting members 12 and 16 is emitted to the outside of the case 60.

Figure 7:
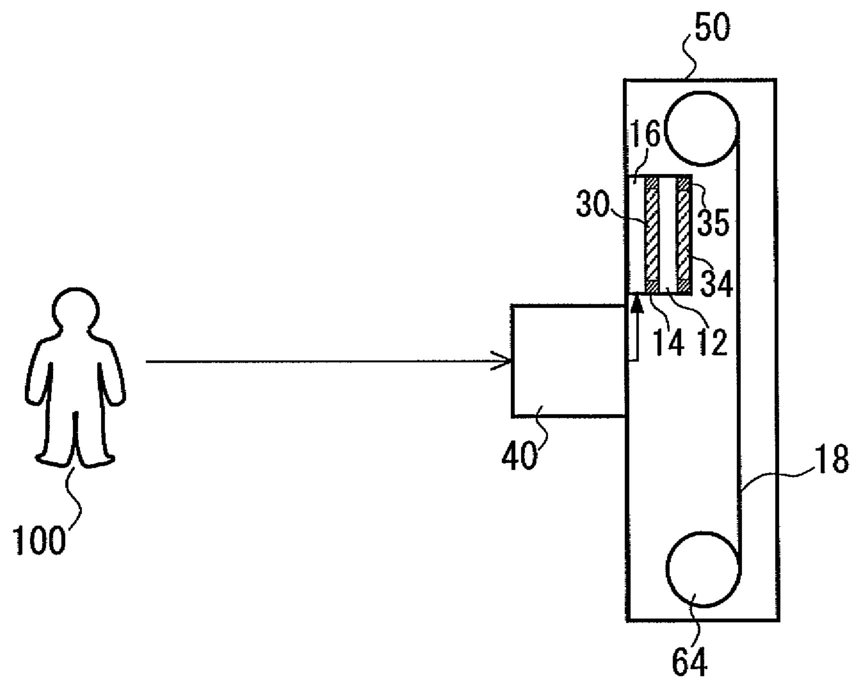
FIG. 7 shows another embodiment of the printing system using the print unit of FIG. 6.

FIG. 7 shows another printing system using the print unit shown in FIG. 6. The printing system 51 in FIG. 7 includes a photographing unit 40 which takes a photo of the object 100 and provides the photographed image to the control unit 20. In addition, the control unit 20 is not shown in the drawing for simplification. The printing system 51 includes rollers 64 a supporting unit. Two rollers 64 support each end of the photosensitive medium 18. The second light-emitting member 16 is arranged on a side confronted with the object 100 in the printing system 51 at the time of take a photo. In other words, the multilayered structure of the light-emitting members 12 and 16 and the liquid crystal shutters 30 and 34 in the FIG. 5 is arranged on a side confronted with the object 10 in the printing system 51.

The control unit 20 activates the first and second plane light-emitting members 12 and 16 as strobes which illuminate the object 100 at the time of take a photo. The control unit 20 opens the first and second liquid crystal shutters 30 and 34, and illuminates the first and second plane light-emitting members 12 and 16. Therefore, it is possible to compose the light emitted by the first and second plane light-emitting members 12 and 16, and can illuminate the object 100. In addition, it is possible to protect the photosensitive medium 18 from strong light which is composed of light emitted by the first and second plane light-emitting members 12 and 16 by closing the second liquid crystal shutter 34. Therefore, it is possible to accomplish a light-emitting member of high brightness according to the simple structure of the present embodiment.

As mentioned above, it is possible to accomplish a print unit which can print photosensitive media at a high speed and includes a light source illuminating the outside of the print unit, according to the simple structure of the present embodiment. Moreover, the print unit of this embodiment can display the image to the outside of the print unit, and transfer the image to the photosensitive media.

Figure 8:
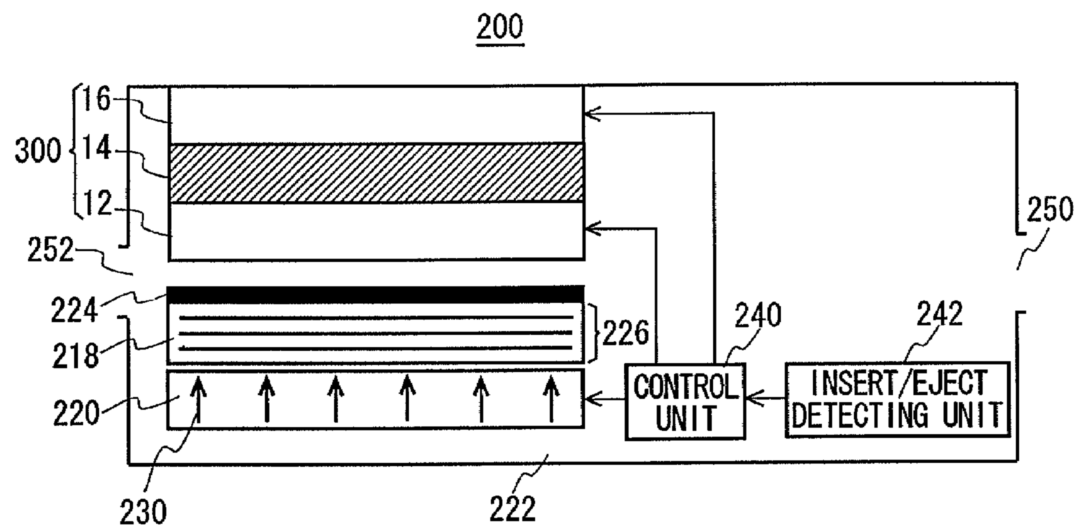
FIG. 8 shows a schematic diagram of a structure of a print unit according to another embodiment of the present invention.

FIG. 8 shows a schematic diagram which shows a structure of a print unit 200 according to another embodiment of the present invention. The print unit 200 includes a plane light-emitting transferring unit 300, a pressing unit 200, a control unit 240, an insert/eject detecting unit 242 and a case 222.

The plane light-emitting transferring unit 300 of the print unit 200 includes a first plane light-emitting member 12, an intercepting member 14 and a second plane light-emitting member 16. The detailed explanation of the first plane light-emitting member 12, the intercepting member 14 and the second plane light-emitting member 16 is omitted because it is the same with that of the print unit 10 shown in FIG. 1.

Figure 9:
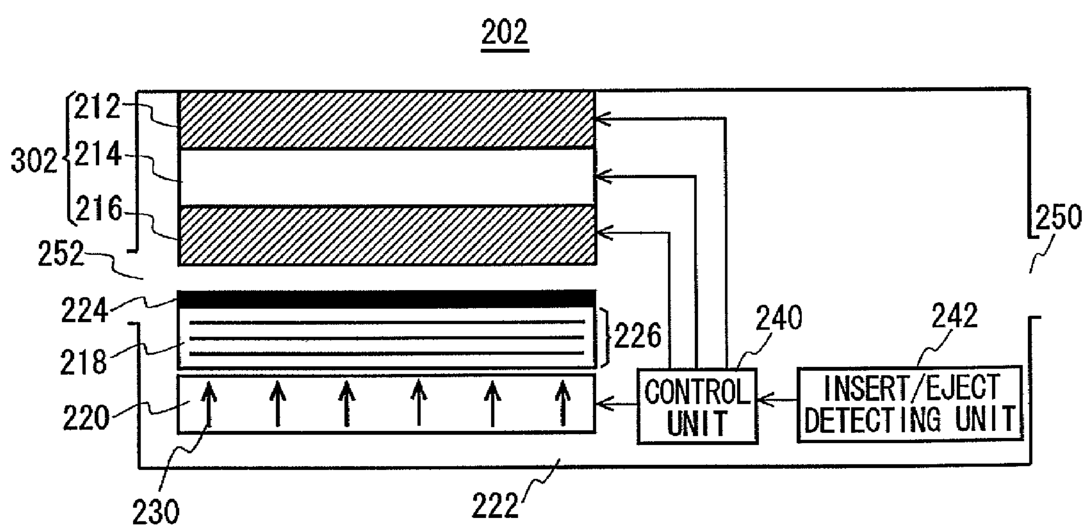
FIG. 9 shows a schematic diagram of a structure of a print unit according to another embodiment of the present invention.

The pressing unit 220 for contacting the photosensitive medium 226 to the plane light-emitting transferring unit 300 presses either the photosensitive medium 226 or the plane light-emitting transferring unit 300 to the other one. In the embodiment of the FIG. 9, the pressing unit 220 presses the photosensitive medium 226 to the plane light-emitting transferring unit 302. The pressing unit 220 in the embodiment of FIG. 9 is provided on the bottom of the film cassette 218. In this case, the pressing unit 220 presses the photosensitive medium 226 to the plane light-emitting transferring unit 302 from the bottom side of the film cassette 218, and the photosensitive medium 226 is in contact with the bottom of the plane light-emitting transferring unit 302. Since the photosensitive medium 226 is in contact with the plane light-emitting transferring unit 302 by pressing of the pressing unit 220, the image emitted by the plane light-emitting transferring unit 302 can be transferred to the photosensitive medium 226 without large amount of distortion.

The control unit 240 is connected to the first and second plane light-emitting members 12 and 16, the pressing unit 220 and the insert/eject detecting unit 242. Because the control unit 240 is the same with that of the print unit 10 shown in FIG. 1, the detailed explanation about the control unit 240 is omitted.

The insert/eject detecting unit detects whether or not the film cassette 218 is inserted into the case 222 through an inserting hole, and whether or not the film cassette 18 is ejected to the outside of the case 22 through the ejecting hole, and notifies the control unit 240 of the result. The insert/eject detecting unit 242 may be a mechanical switch, which is physically pressed by the film cassette 218, for one example. In response to the notification from the insert/eject detecting unit 242, the control unit 240 controls the pressing unit 240 to weaken the pressing force in order for the film cassette 226 to be easily inserted into or ejected from the case 222. The control unit 240 may weaken the pressing force of the pressing unit 200 unit the pressing force becomes "0".

The insert/eject detecting unit 242 detects whether or not the photosensitive medium 226, where an image is transferred, is completely ejected, and notifies the control unit 240 of the result, when the photosensitive medium 226 is emitted from the case 225. In response to the notification from the insert/eject detecting unit 242, the control unit 240 makes the photosensitive medium 226 be ejected easily from the case 222 by controlling the pressing unit 220 to weaken the pressing force. The control unit 240 may weaken the pressing force of the pressing unit 220 to "0".

The plane light-emitting transferring unit 300 is not limited to the print unit shown in FIG. 1, but may be embodied according to any one of the print units shown in FIGS. 2 to 6.

FIG. 9 shows a schematic diagram of another embodiment of the print unit 220 according to the present invention. The print unit 220 includes a plane light-emitting transferring unit 302, a pressing unit 220, a control unit 240, an insert/eject detecting unit 242 and a case 222.

The case 222 encloses the plane light-emitting transferring unit 302, the pressing unit 220, the control unit 240 and the insert/eject detecting unit 242. Moreover, the case 222 encloses the film cassette 218. The film cassette 18 accommodates a plurality of the photosensitive media 226, and a light-intercepting sheet 224 is located at an outermost layer of the plurality of the photosensitive media 226. The case 222 encloses the film cassette 218 so that the light-intercepting sheet 224 of the film cassette 218 is confronted with the plane light-emitting transferring unit 302. Further, the case 222 includes an inserting hole 250 through which the film cassette 218 is inserted into the case 222, and an ejecting hole 252 through which the film cassette 218 is ejected to outside of the case 222.

The plane light-emitting transferring unit 302 transfers an image to the photosensitive medium 226 by emitting the image light. The plane light-emitting transferring unit 302 includes an EL light-emitting member 214 substantially of a sheet shape as an example of the plane light-emitting member, a first liquid crystal shutter 216 and a second liquid crystal shutter 212. The first liquid crystal shutter 216 is formed on the bottom of the EL light-emitting member 214. In other words, the plane light-emitting transferring unit 302 includes the first liquid crystal shutter 216 on a side confronted with the photosensitive medium 226. The drawing and explanation of the shutter control unit of the first and second liquid crystal shutters 216 and 212 is omitted because they are the same with those the embodiment shown in FIG. 4.

The second liquid crystal shutter 212 is formed on an upper side of the EL light-emitting member 214. In other words, the plane light-emitting transferring unit 302 includes the second liquid crystal shutter 212 on the opposite side of the side where the first liquid crystal shutter 216 of the EL light-emitting member 214 is provided. The upper side of the second liquid crystal shutter 212 is arranged on the surface of the case 222 in order to be seen from the outside of the case 222. For example, the surface of the second liquid crystal shutter 212 can be seen from the outside of the case 222 by inserting the second liquid crystal shutter 222 through a hole, which is formed on a portion of the case 222. Therefore, the image emitted by the EL light-emitting member 214 can be seen from the out side when the second liquid crystal shutter 212 is open.

The pressing unit 220 for contacting the photosensitive medium 226 with the plane light-emitting transferring unit 302 presses either the photosensitive medium 226 or the plane light-emitting transferring unit 302 to the other one. According to the embodiment shown in FIG. 9, the pressing unit 220 presses the photosensitive medium 226 toward the plane light-emitting transferring unit 302. In other words, the pressing unit 220 is provided on the bottom of the film cassette 218 in the embodiment shown in FIG. 9. In this case, the pressing unit 220 presses the photosensitive medium 226 to the plane light-emitting transferring unit 302 from the bottom, and contacts the photosensitive medium 226 with the bottom of the plane light-emitting transferring unit 302. By using the pressing unit 220 for contacting the photosensitive medium 226 with the plane light-emitting transferring unit 302, the image formed on the plane light-emitting transferring unit 302 can be transferred to the photosensitive medium 226 without large amount of distortion.

The control unit 240 is connected to the first liquid crystal shutter 216, the EL light-emitting member 214 and the second liquid crystal shutter 212. The control unit 240 controls the first and second liquid crystal shutters 214 and 216, individually. For example, the control unit 240 closes the first liquid crystal shutter 216 and opens the second liquid crystal shutter 212 in case of displaying the image, which is formed on the plane light-emitting transferring unit 302, to the outside of the case 222. Therefore, it is possible to watch an image formed on the EL light-emitting member 214 from the outside of the case 226 without exposing the photosensitive medium 226. Moreover, the control unit 240 opens the first liquid crystal shutter 216 and closes the second liquid crystal shutter 212 in case of transferring the image formed on the plane light-emitting transferring unit 302 to the photosensitive medium 226. Therefore, light from the outside of the case 222 dose not go into the inside of the case 222, and only the light illuminated by the EL light-emitting member 214 transmits through the first liquid crystal shutter 216 and reached the photosensitive medium 226.

Further, the control unit 240 adjusts the gradation of image exposed to the photosensitive medium 226 by controlling shutter speed of the first liquid crystal shutter 216 and illuminating time of the EL light-emitting member 214.

Further, the control unit 240 is connected to the pressing unit 220 and the insert/eject detecting unit 242. The insert/eject detecting unit 242 detects whether or not the film cassette 218 is inserted to the case 222 through the inserting hole 250, and whether the film cassette 18 is ejected to the outside of the case 222 through the ejecting hole 252, and notifies the control unit 240 of the result. The insert/eject detecting unit 242 may be a mechanical switch which is physically pressed by the film cassette 218, for example. In response to the notification from the insert/eject detecting unit 242, the control unit 240 makes the photosensitive medium 226 be ejected easily from the case 222 by controlling the pressing unit 220 to weaken the pressing force. The control unit 240 may weaken the pressing force of the pressing unit 220 to "0".

The insert/eject detecting unit 242 detects whether or not the photosensitive medium 226, where an image is transferred, is completely ejected, and notifies the control unit 240 of the result, when the photosensitive medium 226 is emitted from the case 225. In response to the notification from the insert/eject detecting unit 242, the control unit 240 makes the photosensitive medium 226 be ejected easily from the case 222 by controlling the pressing unit 220 to weaken the pressing force. The control unit 240 may weaken the pressing force of the pressing unit 220 to "0".

FIG. 10A to FIG. 10D show series of operations of the print unit 202 when the print unit is used.

Figure 10A:
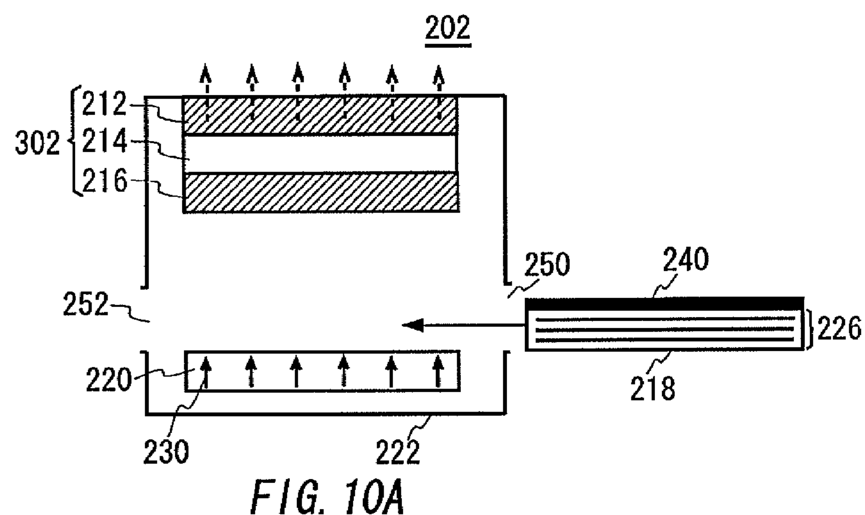
FIGS. 10(A) through 10(D) show a series of operations of the print unit when it is used.

First of all, as shown in FIG. 10A, the control unit 240 closes the first liquid crystal shutter 216, opens the second liquid crystal shutter 212 and emits image for outside display on EL light-emitting member 214 when the film cassette 218 is not existed in the case 220. Therefore, the image for outside display emitted by the EL light-emitting member 214 can be seen from the outside of the case 222.

Next, the insert/eject detecting unit 242 (not shown) detects whether or not the film cassette 218 is completely inserted into the print unit 210 when the film cassette 218 is inserted into the print unit 210, and notifies the control unit 240 of the result. Here, the control unit 240 controls the pressing unit 220 to weaken the pressing force which presses the film cassette 218 to the plane light-emitting transferring unit 302. The control unit 240 may weaken the pressing force of the pressing unit 20 until it becomes "0".

Figure 10B:
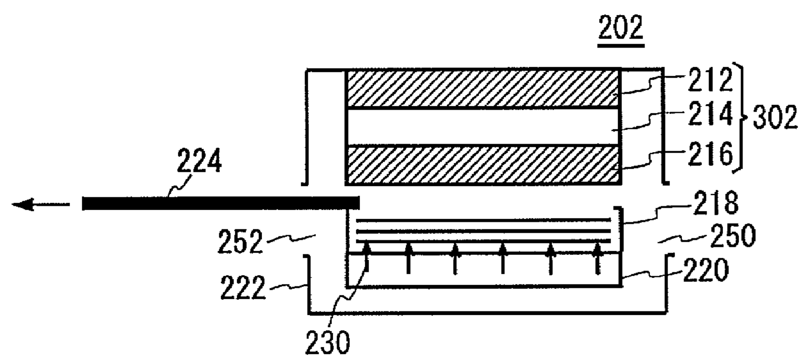

As shown in FIG. 10B, if the film cassette 218 is provided on a side confronted with the plane light-emitting transferring unit 302, the light-intercepting sheet 224, which is provided on the outermost layer of the plurality of the photosensitive media 226, is ejected from the film cassette 218. Then, the photosensitive medium 226 is arranged on the outermost layer in the film cassette 218 and confronts with the plane light-emitting transferring unit 302 after the light-intercepting sheet 224 is ejected from the film cassette 218. Next, the control unit 240 controls the pressing unit 220 to increase the pressing force which presses the plane light-emitting member 226 in the direction towards the plane light-emitting transferring unit 302. Thus, the photosensitive medium 220 is in contact with the plane light-emitting transferring unit 302. Further, it is also possible to eject the light-intercepting sheet 224 from the film cassette 218 after the control unit 240 controls the pressing unit 226 to increase the pressing force, which is pressing the light-intercepting sheet 224 to the plane light-emitting transferring unit 302, in order for the photosensitive medium 226 not to be exposed.

Figure 10C:
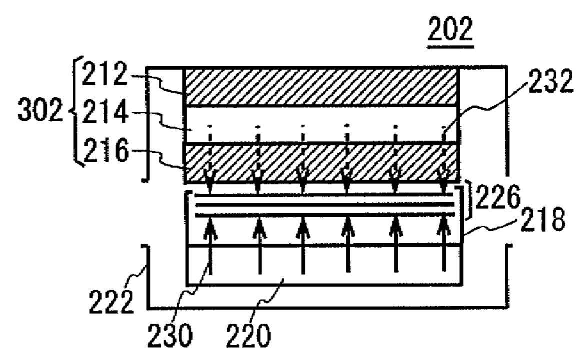

Next, as shown in FIG. 10C, the control unit 240 makes the light emitted from the EL light-emitting member 214 reach the photosensitive medium 226 by opening the first liquid crystal shutter 216 and closing the second liquid crystal shutter 212. Moreover, the control unit 240 transfers the image to the photosensitive medium 226 by emitting the image from the EL light-emitting member 214. The photosensitive medium 226, where the image is transferred, is ejected from the case 222 as the light-intercepting sheet 224 is ejected from the case 222. Further, it is also possible to eject the photosensitive medium 226 after the control unit 240 controls the pressing unit 220 to intensify the pressing force, which presses the light-intercepting sheet 224 to the plane light-emitting transferring unit 302, in order not for the photosensitive medium 226 positioned under that just ejected to be exposed.

Figure 10D:
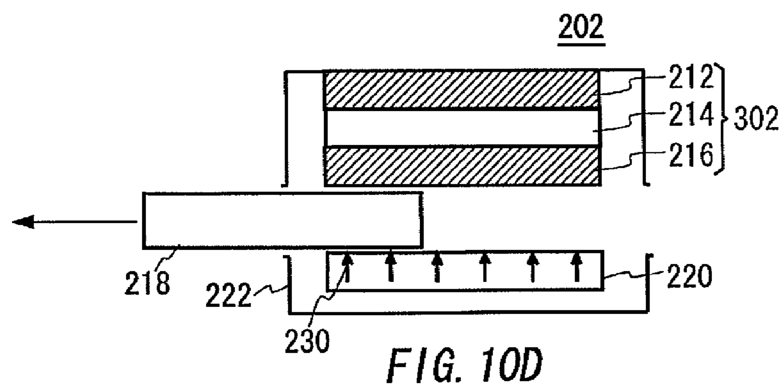

Next, as shown in FIG. 10D, if all of photosensitive media 226 of the film cassette 218 is consumed, the film cassette 218 is ejected from the print unit 210. At that time, the control unit 240 weakens the pressing force of the pressing unit 220 against the film cassette 218 so that the film cassette 218 is ejected easily from the print unit 202. The control unit 240 may weaken the pressing force of the pressing unit 220 until it becomes "0".

Figure 11:
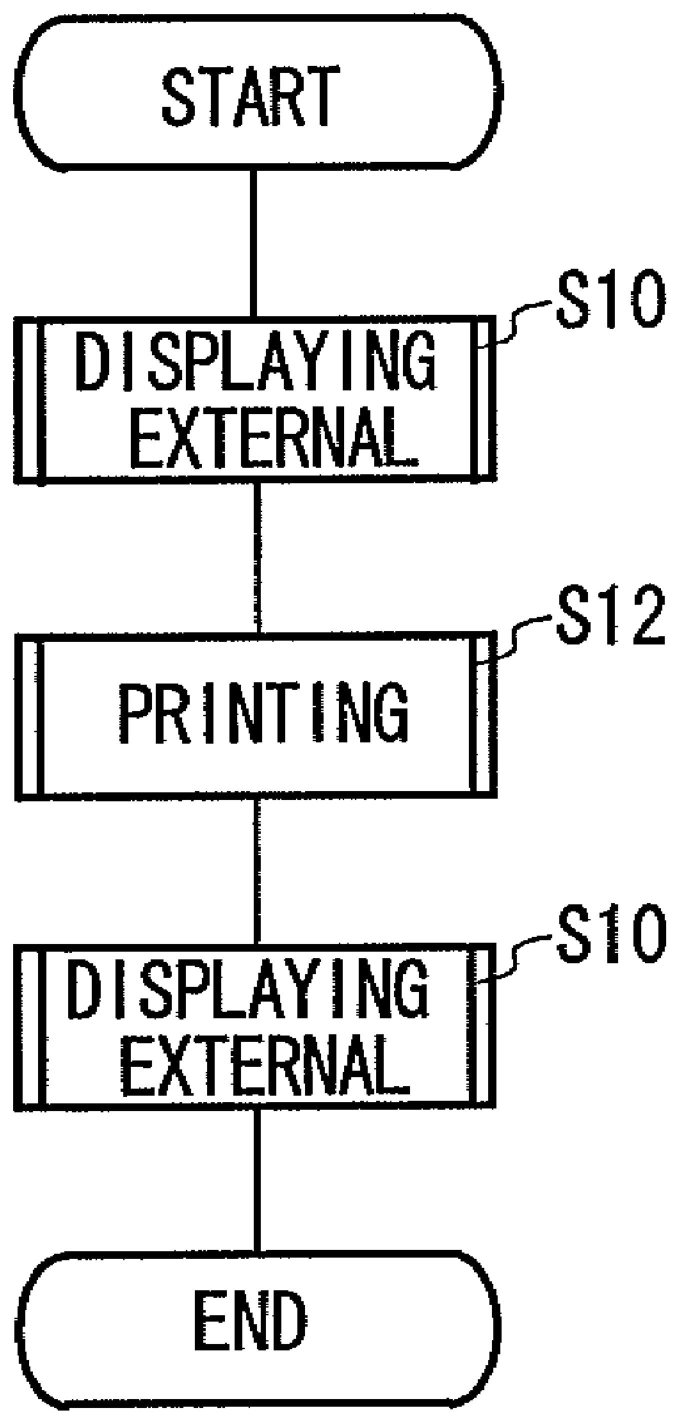
FIG. 11 shows a control flow of the control unit.

FIG. 11 shows the control flow of the control unit 240. When the control unit 240 dose not transfer the image to the photosensitive medium 226, it displays the image emitted by the plane light-emitting transferring unit 302 to outside of the case 222 (S10). The control unit 240 performs a printing step in case of transferring the image to the photosensitive medium 226 (S12). When transferring of the image to the photosensitive medium 226 is stopped, the control unit 240 performs external display of the image again (S10) The above-mentioned processes are performed repeatedly.

Figure 12:
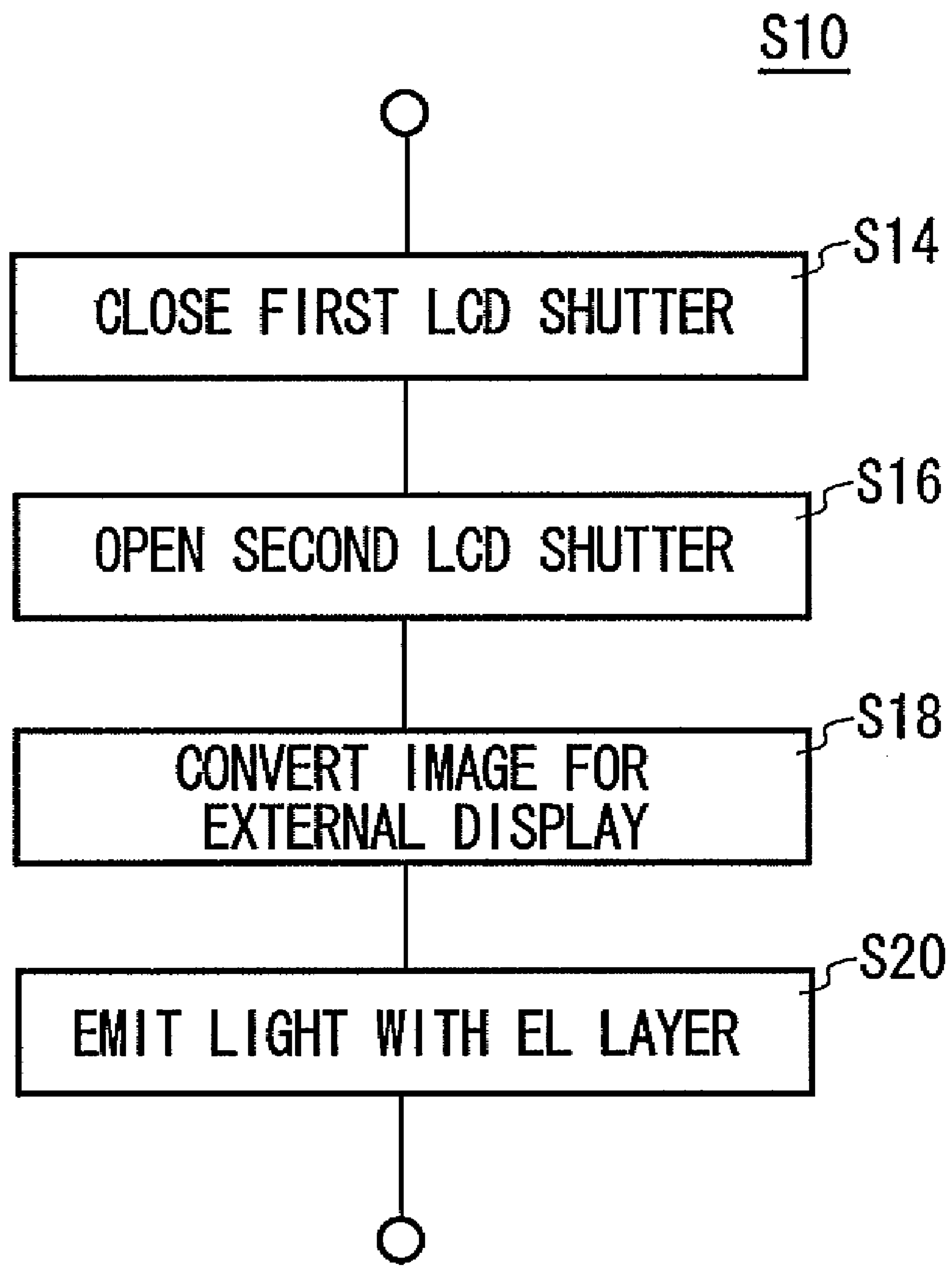
FIG. 12 shows a detailed diagram of the control flow of the external display step S10.

FIG. 12 shows details of the control flow of step S10 for external display. First, the control unit 240 closes the first liquid crystal shutter 216 (S14). Thus, it is possible that the light outside of the case 222 is intercepted and cannot reach the photosensitive medium 226. Next, the control unit 240 opens the second liquid crystal shutter 212 (S16). Thus, the image emitted by the EL light-emitting member 214 passes through the second liquid crystal shutter 212 and can be seen from outside of the case 222. Next, the control unit 240 converts the image for external display to one which can be displayed by EL light-emitting member 214 (S18). Next, the EL light-emitting member 214 emits the image for external display (S20).

Figure 13:
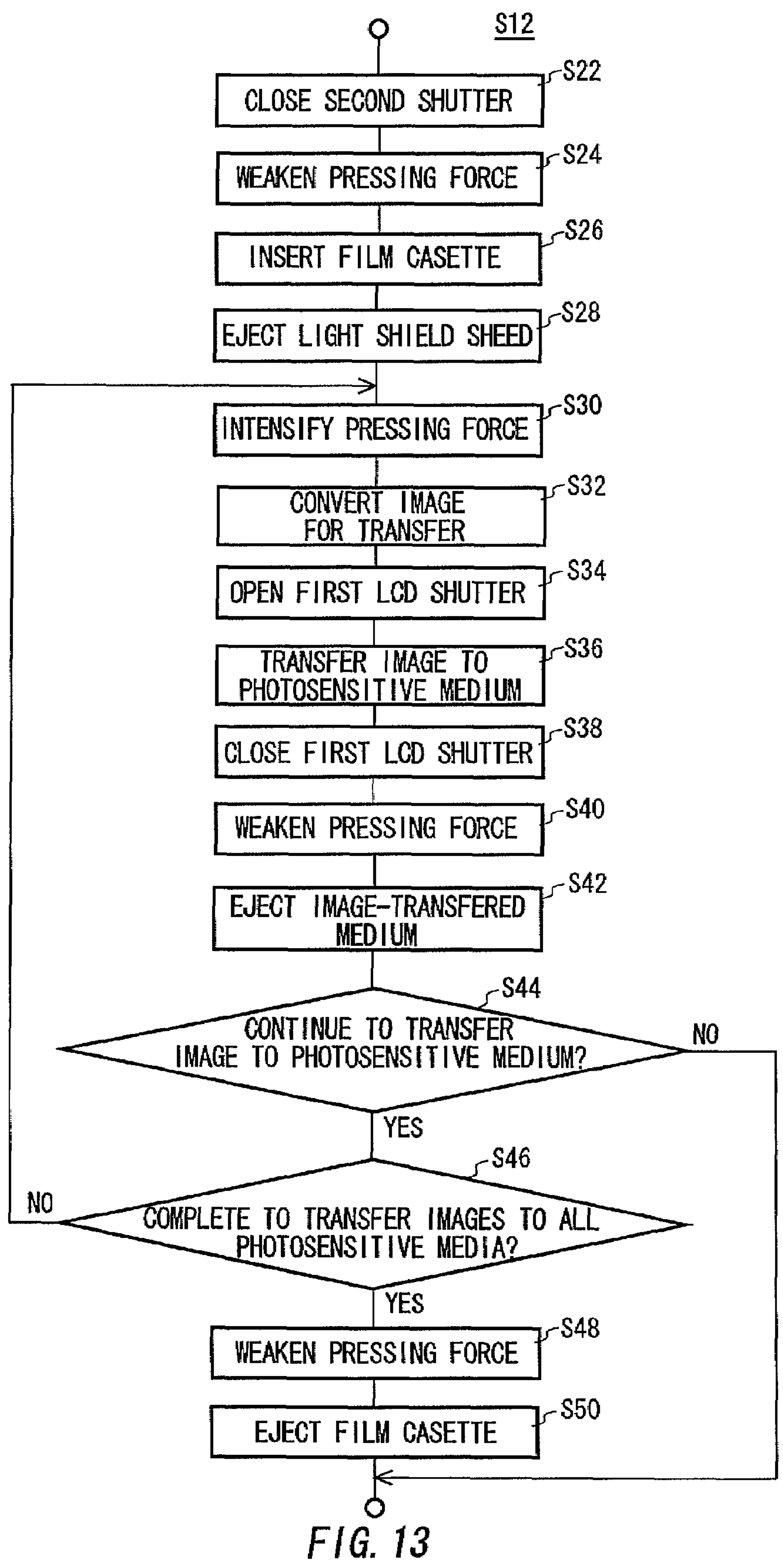
FIG. 13 shows a detailed diagram of the control flow of the printing step S12.

FIG. 13 shows details of the control flow of the printing step S12. First, the control unit 240 closes the second liquid crystal shutter (S22). Then, it is possible that the light outside of the case 222 is intercepted and can not reach the photosensitive medium 226. Next, the control unit 240 weakens the pressing force 230 of the pressing unit 220 (S24). Next, the film cassette 218 is inserted and disposed in the case 222 (S26). Next, the control unit 240 ejects the light-intercepting sheet 224 from the case 222 (S28).

Next, the control unit 240 contacts the photosensitive medium 226 with the plane light-emitting transferring unit 302 by increasing the pressing force 230 of pressing unit 220 (S30). Next, the control unit 240 converts an image, which will be transferred to the photosensitive medium 226, to one which can be emitted by the EL light-emitting member 214 (S32). In other words, the control unit 240 converts the image so that that of the EL light-emitting member 214 is arranged in the right position of the photosensitive medium 226. Next, the control unit 240 controls the EL light-emitting member 214 to emit an image under a condition where the EL light-emitting member 214 maintains its brightness enough for the photosensitive medium 226 to be exposed, and opens the first liquid crystal shutter 216 corresponding to each of pixels of the EL light-emitting member 214 according to gradation of an image which should be transferred to the photosensitive medium 218 (S28). The liquid crystal shutter can control gradation in order to adjust the intensity of illumination according to applied voltage. Thus, the image emitted by the EL light-emitting member 214 is transferred to the photosensitive medium 216 with some degree of gradation. Here, it is not necessary to open the first liquid crystal shutter 216 corresponding to each of the pixels of the EL light-emitting member 214 one by one, but it may be preferable to open all of the first liquid crystal shutter 26 corresponding to all of the pixels.

After transferring the image to the photosensitive medium 226 is finished, the control unit 240 closes all of the first liquid crystal shutter 216 corresponding to each of the pixels of the EL light-emitting member 214 (S38). Next, the control unit 240 weakens the pressing force 230 of the pressing unit 220 (S40), and ejects the photosensitive medium 226 where the image is transferred from the case 222 (S42).

Next, the control unit 240 determines whether or not the transferring of the image to the photosensitive medium 226 will be continued. In case the transferring of the image to the photosensitive medium 226 will not be continued (S44; NO), the control unit 240 stops the printing step (S12). In case the transferring of the image to the photosensitive medium 226 will be continued (S44; YES), the control unit 240 determines whether or not images were transferred to all photosensitive media 226 in the film cassette 218 (S46). In case there is no photosensitive medium 226 in the film cassette 218 to which an image is not transferred (S46; YES), the control unit 240 weakens the pressing force 230 of the pressing unit 220 (S48), eject the film cassette 218 to outside of the case 222 (S50), and stops the printing step S12. In case there is any photosensitive medium 226 in the film cassette 218 to which image is not transferred (S46; NO), the control unit 240 turns the operation to the step S30 of increasing the pressing force 230 of the pressing unit 220.

According to the embodiment described with reference to FIGS. 9 to 13, the image formed on the plane light-emitting transferring unit 302 can be displayed to outside of the case 222, and can be transferred to the photosensitive medium 226, with a simple structure of the print unit of the present invention. Thus, the printer can be miniaturized. Moreover, since the exposure is performed on the photosensitive medium 218 in plane, the required time for transferring an image to the photosensitive medium is short. Moreover, since the print unit contacts the photosensitive medium with the plane light-emitting transferring unit 302 by including the pressing unit 220, the image formed on the plane light-emitting transferring unit 302 can be surely transferred to the photosensitive medium 226.

Figure 14:
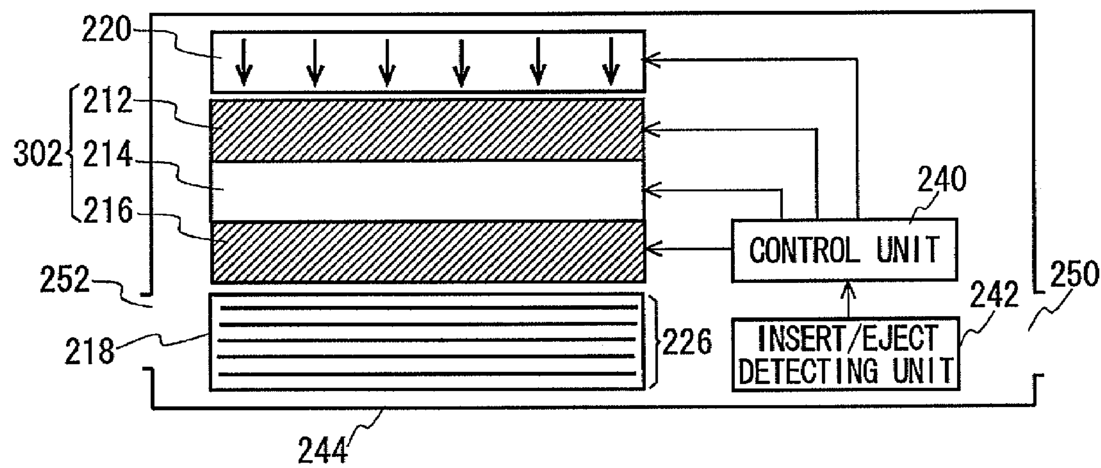
FIG. 14 shows another embodiment of the print unit.

FIG. 14 shows the print unit 203 according to another embodiment of the present invention. In the present embodiment shown in FIG. 9, the pressing unit 220 presses the photosensitive medium 226 to the plane light-emitting transferring unit 302. In FIG. 14, the pressing unit 220 presses the plane light-emitting transferring 302 to the photosensitive medium 226 in the print unit 203. The pressing unit 220 is provided on the upper part of the plane light-emitting transferring unit 302. Thus, the pressing unit 220 can press the plane light-emitting transferring unit 302 to the photosensitive medium 226 from the plane light-emitting transferring unit 302. By using the pressing unit 220 and contacting the photosensitive medium 226 with the plane light-emitting transferring unit 302, the image formed on the plane light-emitting transferring unit 302 is surely transferred to the photosensitive medium 226.

Figure 15:
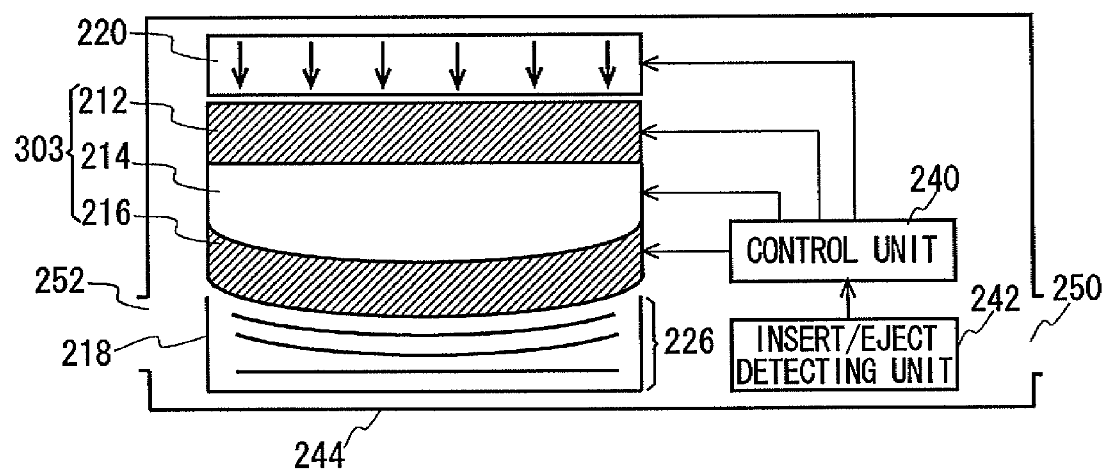
FIG. 15 shows another embodiment of the print unit.

FIG. 15 shows the print unit 204 according to another embodiment of the present invention. The plane light-emitting transferring unit 303 of the print unit 204 includes a curved surface at a portion confronted with the photosensitive medium 226. Particularly, the light-emitting member 214 and the first liquid crystal shutter 216 has a convex portion which is confronted with the photosensitive medium 226. Thus, the photosensitive medium 226 is in closer contact with the surface of the liquid crystal shutter than when the surface of the plane light-emitting transferring unit 303, which is confronted with the photosensitive medium 226, is flat. Therefore, the image formed on the plane light-emitting transferring unit 303 can be even surely transferred to the photosensitive medium 226.

Figure 16:
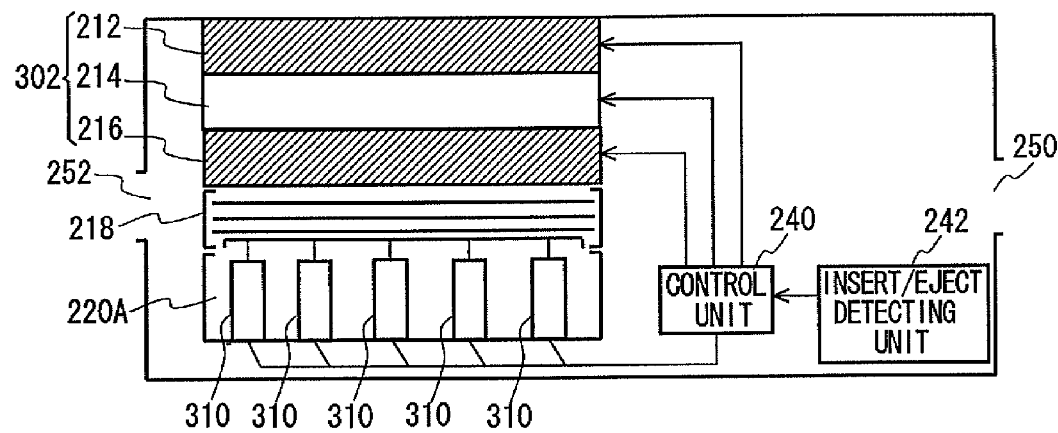
FIG. 16 shows an example of embodiment of the pressing unit.

FIG. 16 shows an embodiment of the pressing unit 220 according to the present invention. The pressing unit 220A in FIG. 16 includes an electromagnet unit 310, which has a plurality of electromagnets, for dynamically pressing the photosensitive medium 226 to the plane light-emitting transferring unit 302 when electric current is supplied. The control unit 204 increases the electric current supplied to the electromagnet unit 310, in case of increasing the pressing force 230 of the pressing unit 220A. To the contrary, the control unit 240 decreases the electric current supplied to the electromagnet unit 310 in case of weakening the pressing force of the pressing unit 220A.

Figure 17:
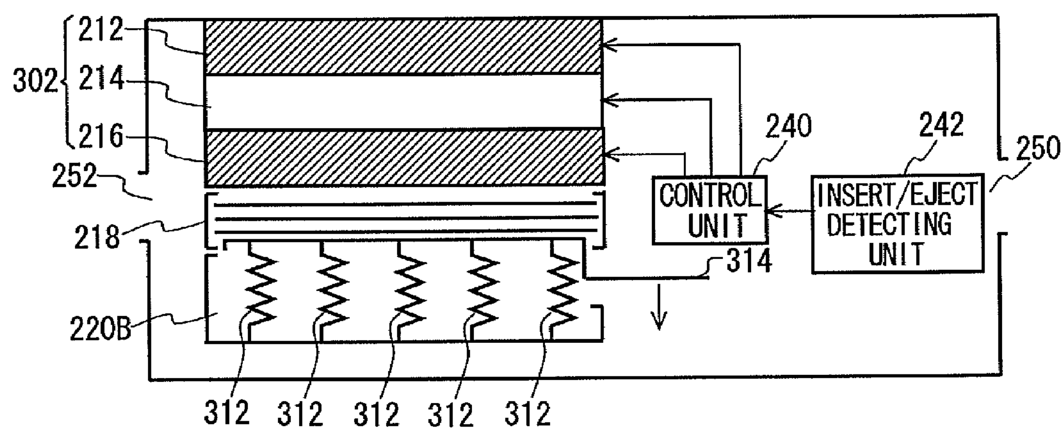
FIG. 17 shows another embodiment of the pressing unit of the print unit.

FIG. 17 shows another embodiment of the pressing unit 220B according to the present invention. The pressing unit 220B shown in FIG. 17 includes a plurality of springs 312 as elastic members disposed to be perpendicular to the surface of the photosensitive medium 226. The pressing unit 220B includes a releasing member 314 for pushing back the springs 312 in a direction away from the photosensitive medium 226. For example, sponge shown in FIG. 18 other than spring may used as the elastic member.

Figure 18:
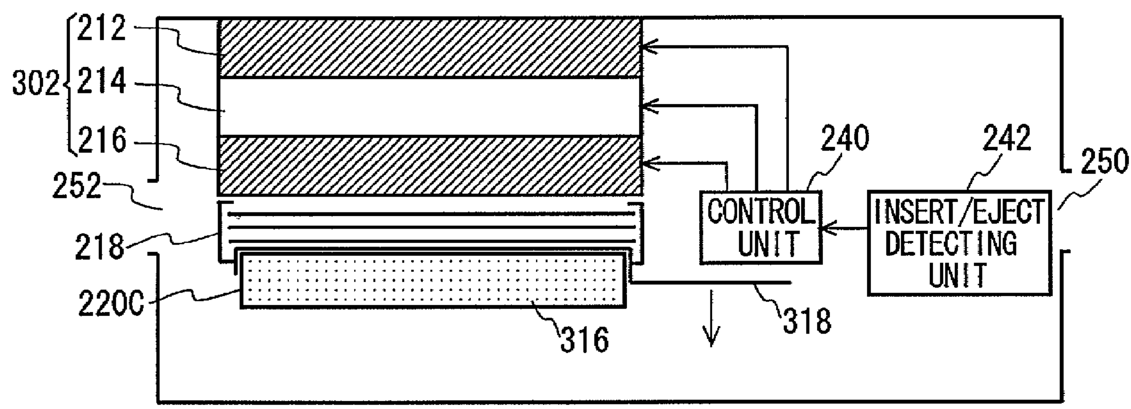
FIG. 18 shows another embodiment of the pressing unit of the print unit.

FIG. 18 shows another embodiment of the pressing unit 220C according to the present invention. The pressing unit 220C includes an elastic member 316, such as sponge and so on, for pressing the photosensitive medium 226 to the EL light-emitting member 214. The pressing unit 220C includes a releasing member 318 for pushing back the sponge 316 in a direction away from the photosensitive medium 226 in case of weakening the pressing force.

Figure 19:
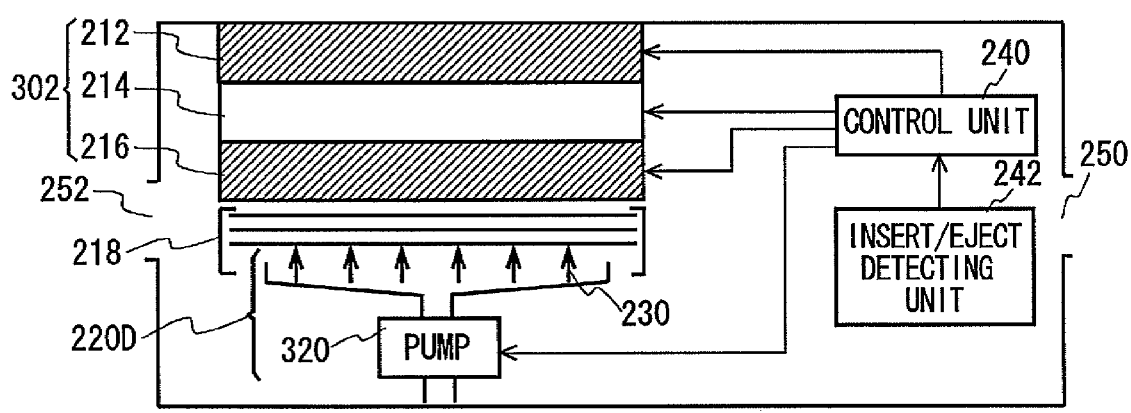
FIG. 19 shows another embodiment of the pressing unit of the print unit.

FIG. 19 shows another embodiment of the pressing unit 220D of the present invention. The pressing unit 220D includes an air pressure control unit for pressing the photosensitive medium 226 to the EL light-emitting member 214. In the embodiment of FIG. 19, a pump 320 can be used as the air pressure control unit. The control unit 240 controls the pump 320 to increase the air pressure applied to the photosensitive medium 226 in case of increasing the pressing force 230 of the pressing unit 220D. To the contrary, the control unit 240 controls the pump 320 to decrease the air pressure applied to the photosensitive medium 226 in case of decreasing the pressing force 230 of the pressing unit 220D. It is also possible to contact the photosensitive medium 226 with the plane light-emitting transferring unit 302 by using a pump which sucks air between the photosensitive medium 226 and the plane light-emitting transferring unit 302 to make a vacuum condition, other than the embodiment shown in FIG. 19. The pressing unit 220 is not limited to the embodiments shown in FIGS. 16 to 19.

Figure 20A:
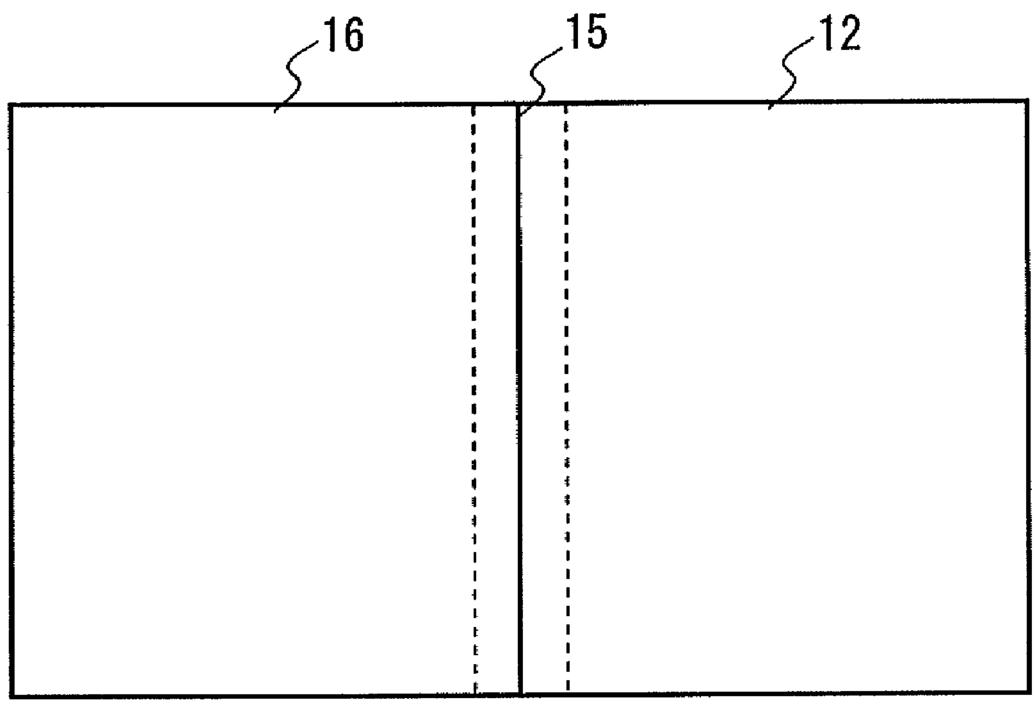
FIGS. 20A and 20B are plan and side views showing a method for producing a plane light-emitting transferring unit of the print unit.
Figure 20B:
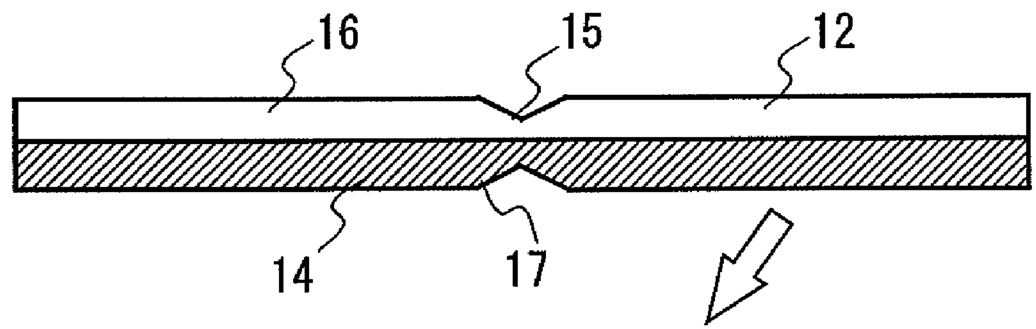

FIGS. 20A and 20B are plan and side views showing a method for producing a plane light-emitting transferring unit of the print unit. In the method for producing the plane light-emitting transferring unit 300A, an EL light-emitting unit in the sheet shape is formed, having a first light-emitting area 12, a second light emitting area 16, and a connecting portion 15 provided between the first light-emitting area 12 and the second light emitting area 16. In the embodiment shown in FIGS. 20A and 20B, the connecting portion 15 is formed such that the thickness is gradually thinner to the center. An intercepting member 14 is formed on whole over one side of the EL light-emitting unit. The intercepting member 14 is, for example, formed separately from the EL light-emitting unit and adhered to the EL light-emitting unit. The intercepting member 14 has a connecting portion 17 with thinner thickness at a position corresponding to the connecting portion 25 of the EL light-emitting unit. Later, the first light-emitting area 12 and the second light emitting area 16 are bent (in a direction of a allow in FIG. 20B) around the connecting portions 15 and 17 as a center such that the first light-emitting area 12 and the second light emitting area 16 oppose to each other. Surfaces of the intercepting member 14 facing to each other resulting the bending is adhered. Finally, the plane light-emitting transferring unit 300A of the print unit is produced.

Figure 21:
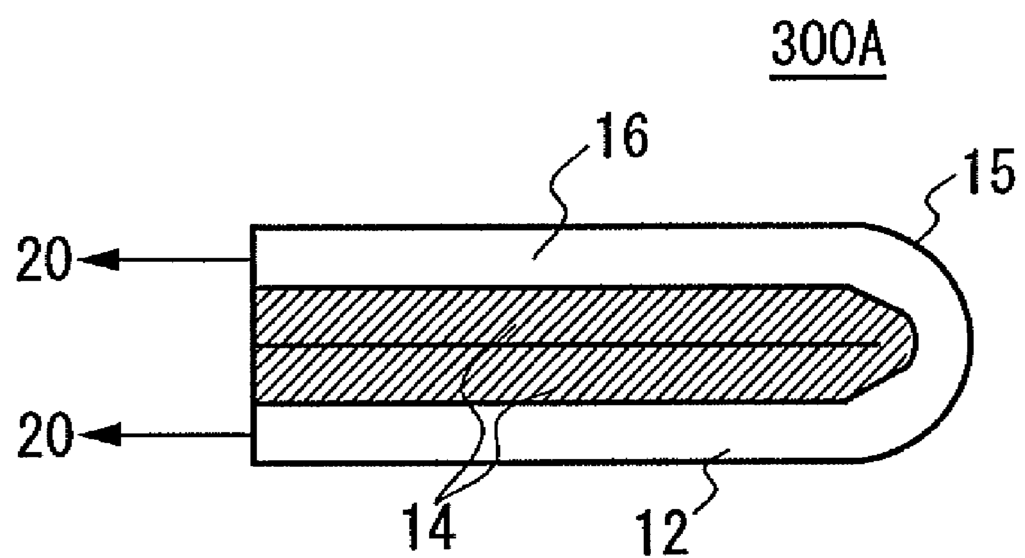
FIG. 21 is a side view showing a plane light-emitting transferring unit produced by the method of FIGS. 20A and 20B.

FIG. 21 is a side view showing a plane light-emitting transferring unit 300A produced by the method of FIGS. 20A and 20B. The first light-emitting area 12 and the second light emitting area 16 connects to the control unit 20, respectively. Accordingly, the first light-emitting area 12 and the second light emitting area 16 serve as the first light-emitting member 12 and the second light emitting member 16, respectively.

Figure 22A:
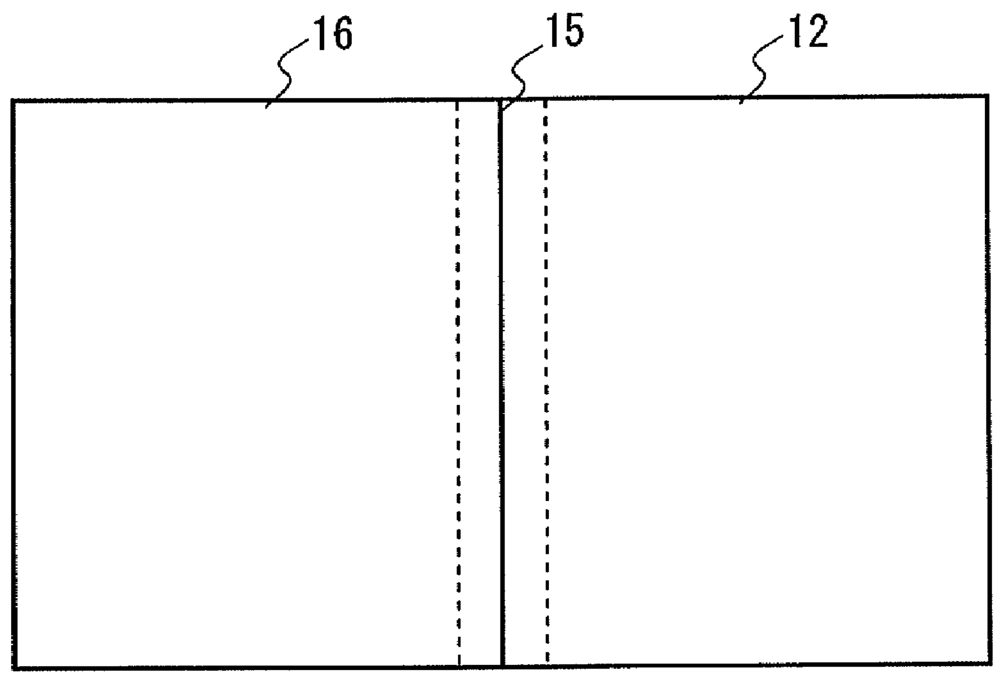
FIGS. 22A and 22B are plan and side views showing another method for producing a plane light-emitting transferring unit of the print unit.
Figure 22B:
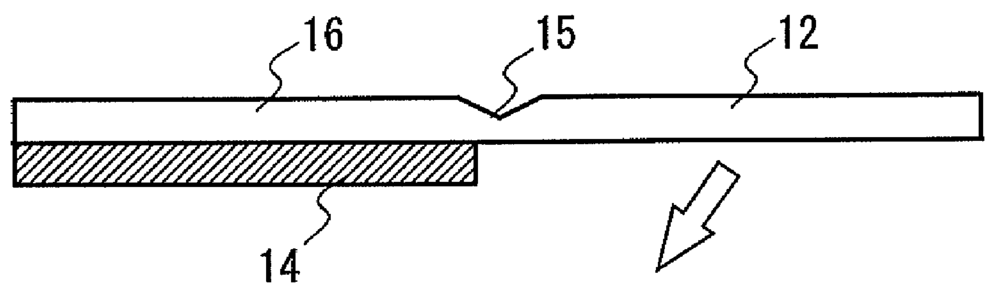

FIGS. 22A and 22B are plan and side views showing another method for producing a plane light-emitting transferring unit of the print unit. Similar to the method shown in FIGS. 20A and 20B, in the method shown in FIGS. 22A and 22B, an EL light-emitting unit in the sheet shape is formed, having a first light-emitting area 12, a second light emitting area 16, and a connecting portion 15 provided between the first light-emitting area 12 and the second light emitting area 16. An intercepting member 14 is formed on half area of one side of the EL light-emitting unit. In the present embodiment, the intercepting member 14 is formed on the half area of the EL light-emitting unit corresponding to the second light-emitting area 16. Later, the first light-emitting area 12 and the second light emitting area 16 are bent (in a direction of a allow in FIG. 20B) around the connecting portions 15 and 17 as a center such that the first light-emitting area 12 and the second light emitting area 16 oppose to each other. The first light-emitting are 12 and the intercepting member 14 facing to each other resulting the bending is adhered. Finally, the plane light-emitting transferring unit 300B of the print unit is produced.

Figure 23:
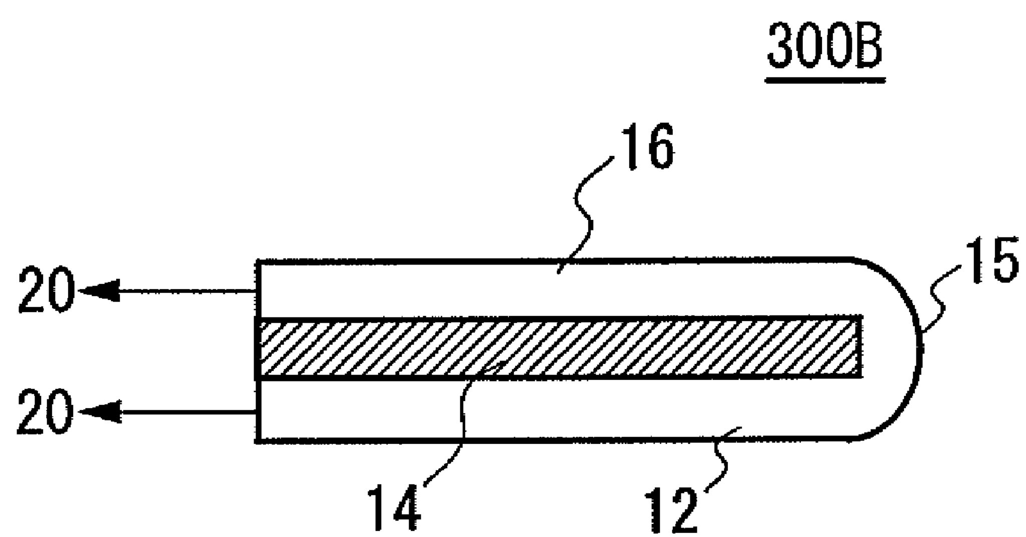
FIG. 23 is a side view showing a plane light-emitting transferring unit produced by the method of FIGS. 22A and 22B.

FIG. 23 is a side view showing a plane light-emitting transferring unit 300B produced by the method of FIGS. 22A and 22B. The first light-emitting area 12 and the second light emitting area 16 connects to the control unit 20, respectively. Accordingly, the first light-emitting area 12 and the second light emitting area 16 serve as the first light-emitting member 12 and the second light emitting member 16, respectively.

In the above-mentioned embodiment, the EL light-emitting member is explained as an example of the light-emitting member. The light-emitting member is, however, not limited to the EL light-emitting member. Instead of the EL light-emitting member, it is possible to use another light-emitting member, such as a light-emitting diode, a liquid crystal display, an electro-chemi luminescence (ECL) member and so on. The electro-chemi luminescence member is formed such that a solution containing organic materials is filled between transparent electrodes. In this case, when a certain voltage is applied between the transparent electrodes of the electro-chemi luminescence member, the organic materials in the solution collide with one another and therefore emit the light. Accordingly, in case where the electro-chemi luminescence member is used, an individual light source is not necessary, furthermore, the electro-chemi luminescence is transparent at no light-emitting, and therefore, degree of freedom in design is large.

As it is clear from the above explanation, according to the present invention, the photosensitive medium can be printed at a high speed by a print unit of a simple structure, and it is possible to provide a print unit which includes a light source illuminating the outside. Moreover, according to the present invention, the image formed on a plane light-emitting member can be transferred to the photosensitive medium without large amount of distortion.

Although the present invention has been described by way of exemplary embodiments, it should be understood that those skilled in the art might make many changes and substitutions without departing from the spirit and the scope of the present invention which is defined only by the appended claims.

What is claimed is:

1. A print unit for transferring an image to a photosensitive medium, comprising:

an intercepting member for intercepting light;

a first plane light-emitting member for forming a first image by emitting light, provided on one side of said intercepting member;

a second plane light-emitting member for forming a second image by emitting light, provided on the other side of said intercepting member;

a control unit for controlling light-emission of said first and second plane light-emitting members, and transferring at least one or more of images formed by said first and second plane light-emitting members, to the photosensitive medium; and wherein said intercepting member includes a first liquid crystal shutter for transmitting or intercepting light selectively, and a first shutter control unit for transmitting light by opening said first liquid crystal shutter or intercepting light by closing said first liquid crystal shutter, and said control unit opens said first liquid crystal shutter by said first shutter control unit, and activates both of said first and second light-emitting members.

2. The print unit as claimed in claim 1, wherein at least one of said first and second plane light-emitting members includes an EL light-emitting member.

3. The print unit as claimed in claim 1, wherein said control unit controls each of said first and second plane light-emitting members independently of each other.

4. The print unit as claimed in claim 1, further comprising a second liquid crystal shutter for intercepting light selectively, which is arranged on a confront side of the photosensitive medium, and a second shutter control unit for intercepting light by closing said second liquid crystal shutter, wherein said control unit closes said second liquid crystal shutter by said second shutter control unit in case of activating both of said first and second light-emitting members.

5. The print unit as claimed in claim 1, wherein at least one of said first and second plane light-emitting member includes an ECL member.

6. A light-emitting member comprising:

an intercepting member for intercepting light;

a first plane light-emitting member provided on one side of said intercepting member; and a second plane light-emitting member provided on the other side of said intercepting member;

wherein said intercepting member includes a first liquid crystal shutter for transmitting or intercepting light selectively, and a first shutter control unit for transmitting light by opening said first liquid crystal shutter or intercepting light by closing said first liquid crystal shutter.

* * * * *